United States Patent
Guo et al.

(10) Patent No.: US 11,155,718 B2
(45) Date of Patent: Oct. 26, 2021

(54) LIGHT REFLECTIVE COATING FOR AUDIO PRODUCT AND PREPARATION METHOD THEREOF

(71) Applicant: Tymphany Acoustic Technology (Huizhou) Co., Ltd., Huizhou (CN)

(72) Inventors: Xiaochun Guo, Huizhou (CN); Liwen Tan, Huizhou (CN); Cheng Ho, Huizhou (CN)

(73) Assignee: TYMPHANY ACOUSTIC TECHNOLOGY (HUIZHOU) CO., LTD., Huizhou (CN)

( * ) Notice: Subject to any disclaimer, the term of this patent is extended or adjusted under 35 U.S.C. 154(b) by 333 days.

(21) Appl. No.: 16/455,378

(22) Filed: Jun. 27, 2019

(65) Prior Publication Data
US 2020/0002546 A1 Jan. 2, 2020

(30) Foreign Application Priority Data
Jun. 28, 2018 (CN) .......................... 201810685053.X

(51) Int. Cl.
| | |
|---|---|
| C09D 5/33 | (2006.01) |
| C09D 7/61 | (2018.01) |
| C09D 7/20 | (2018.01) |
| C09D 7/63 | (2018.01) |
| C09D 133/04 | (2006.01) |
| C09D 163/00 | (2006.01) |
| C09D 7/40 | (2018.01) |
| C08K 3/08 | (2006.01) |

(52) U.S. Cl.
CPC ............... *C09D 5/004* (2013.01); *C09D 7/20* (2018.01); *C09D 7/61* (2018.01); *C09D 7/63* (2018.01); *C09D 7/70* (2018.01); *C09D 133/04* (2013.01); *C09D 163/00* (2013.01); *C08K 2003/0812* (2013.01)

(58) Field of Classification Search
CPC .. C09D 7/70; C09D 5/004; C09D 163/00–10; C09D 133/00–26; C08K 2003/0812
See application file for complete search history.

(56) References Cited

FOREIGN PATENT DOCUMENTS

WO   WO-2007028961 A2 * 3/2007 ............. G02B 5/128

* cited by examiner

*Primary Examiner* — Kregg T Brooks
(74) *Attorney, Agent, or Firm* — Muncy, Geissler, Olds & Lowe, P.,C.

(57) ABSTRACT

A light reflective coating for an audio product, including the following parts by weight of constituents: 15-35 parts by weight of resin, 15-35 parts by weight of glass beads, 20-40 parts by weight of aluminum beads, 5-15 parts by weight of a solidifying agent, 10-25 parts by weight of a solvent and 1-8 parts by weight of an additive. The present invention further includes a method for preparing the light reflective coating for an audio product, adopts organic macromolecular materials having good comprehensive performances to perform optimization and combination, and improves the light reflective performance of the combination. The coating prepared with the method of the present invention has a flat, fine and smooth surface, has good gloss retention, and can satisfy the use requirements of an audio product coating for anti-corrosion, anti-weathering and the like.

9 Claims, 1 Drawing Sheet

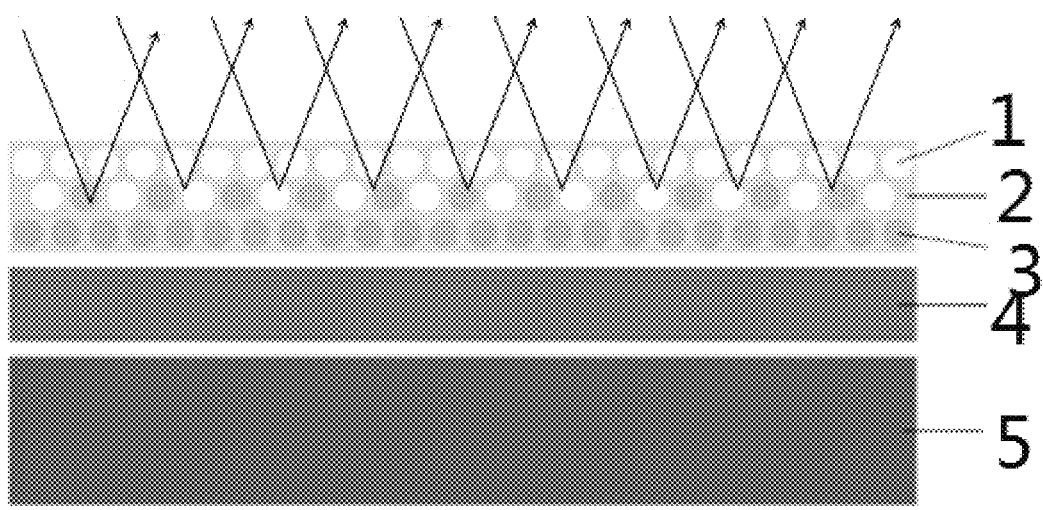

LIGHT REFLECTIVE COATING FOR AUDIO PRODUCT AND PREPARATION METHOD THEREOF

TECHNICAL FIELD

The present invention relates to the technical field of light reflective coatings, in particular to a light reflective coating for an audio product and preparation method thereof.

BACKGROUND

The current process for producing an outdoor sport type audio product can only realize light reflection effect on a single plane; or locally. The processes currently used in industry comprises:
1) a printing laminating process including:
a) silk screen printing, namely printing a light reflective material layer by layer on the surface of cloth or an adhesive tape; and
b) laminating, namely laminating a light reflective tape on the surface of the product. However, an audio product has a complex structure and multiple surfaces. When a curved surface is laminated, the light reflective tape cannot completely seal the surface of the product; and the lamination of multiple surfaces would leave a gap between surfaces.
2) A brush coating process: the brush coating process has a high requirement for film thickness (1.5-3 mm), and the surface is not flat enough. The brush coating process cannot be applied to consumer audio products.

SUMMARY OF THE INVENTION

In order to solve the above-described problems in the prior art, the present invention provides a light reflective coating for an audio product and preparation method thereof.

To achieve the above object, the present invention provides the following technical solution:

A light reflective coating for an audio product, comprising the following parts by weight of constituents: 15-35 parts by weight of resin, 15-35 parts by weight of glass beads, 20-40 parts by weight of aluminum beads, 5-15 parts by weight of a solidifying agent, 10-25 parts by weight of a solvent and 1-8 parts by weight of an additive.

Further, the solvent is a mixture of n-butyl acetate and dimethylbenzene.

Further, the parts by weight of the n-butyl acetate and dimethylbenzene are respectively 15-20 parts by weight and 3-8 parts by weight.

Further, the additive is a mixture of a suspending agent, a dispersing agent, a leveling agent and a catalyst.

Further, the parts by weight of the suspending agent, the dispersing agent, the leveling agent and the catalyst are respectively 1-5 parts by weight, 0.2-2 parts by weight, 0.2-2 parts by weight and 0.1-0.5 parts by weight.

Further, the resin is amino epoxy resin or acrylic resin.

Further, the solidifying agent is an organic amine solidifying agent or a polyurethane solidifying agent.

Further, the suspending agent is fumed silicon dioxide; the dispersing agent is a polyester dispersing agent; the leveling agent is an organic silicon compound; and the catalyst is organic tin.

The present invention further discloses a method for preparing the light reflective coating for an audio product, comprising the following steps: adding appropriate amount of solvent, resin, and additive, stirring until uniform, sequentially adding aluminum beads, glass beads and appropriate amount of solvent, stirring again until uniform, sequentially adding solidifying agent and the remaining solvent, and stirring until uniform to obtain the light reflective coating for an audio product.

Further, the stirring time is 20-30 min.

On the basis of the above-described technical solution, the present invention achieves the following technical effects:

(1) The present invention adopts organic macromolecular materials having good comprehensive performances to perform optimization and combination, and improves the light reflective performance of the combination. The coating prepared with the method of the present invention has an flat, fine and smooth surface, has good gloss retention, and can satisfy the use requirements of an audio product coating for anti-corrosion, anti-weathering and the like; and (2) The present invention fully utilizes resources and energies, is pollution-free during production; the preparation method is simple; the cost is low; the production cycle is short; and the coating has the characteristics of convenient transportation, easy storage, simple use and the like, and is suitable for industrial batch production.

BRIEF DESCRIPTION OF THE DRAWINGS

The FIGURE is a schematic view showing the reflection of a light source coated with the light reflective coating for an audio product of the present invention, wherein 1 is glass beads, 2 is resin, 3 is aluminum beads, 4 is a prime paint layer, and 5 is an audio product shell.

DETAILED DESCRIPTION OF THE EMBODIMENTS

To facilitate the understanding of the present invention, the present invention will be comprehensively described hereafter in connection with the drawings and specific embodiments. The drawings provide preferred embodiments of the present invention. However, the present invention can be realized in various different forms, but not limited to the embodiments described herein. On the contrary, the embodiments are provided with the purpose of more thoroughly and comprehensively understanding the disclosures of the present invention.

It should be noted that when an element is "fixed on" another element, the element can be directly fixed on another element or can also be fixed on an intermediate element; and when an element is "connected to" another element, element can be directly connected to another element or can also be connected to an intermediate element.

To facilitate reading, locality nouns "upper", "lower", "left" and "right" are used according to the drawings, with the purpose of pointing out reference relative positions of various elements, but not for limiting the present application.

Unless otherwise defined, all of the technical and scientific terms used in the text have the same meanings as that a person skilled in the art generally understands. In the text, the terms used in the specification of the present invention are only used to describe specific embodiments, but not intended to limit the present invention.

Embodiment 1

A light reflective coating for an audio product, comprising the following parts by weight of constituents: 30 parts by weight of amino epoxy resin, 25 parts by weight of glass beads, 25 parts by weight of aluminum beads, 5 parts by weight of organic amine solidifying agent, 6 parts by weight of n-butyl acetate, 5 parts by weight of dimethylbenzene, 3 parts by weight of fumed silicon dioxide, 0.2 parts by weight of polyester dispersing agent, 0.5 parts by weight of organic silicon compound and 0.3 parts by weight of organic tin.

Embodiment 2

A light reflective coating for an audio product, comprising the following parts by weight of constituents: 35 parts by weight of acrylic resin, 15 parts by weight of glass beads, 20 parts by weight of aluminum beads, 8 parts by weight of polyurethane solidifying agent, 7 parts by weight of n-butyl acetate, 8 parts by weight of dimethylbenzene, 5 parts by weight of fumed silicon dioxide, 0.5 parts by weight of polyester dispersing agent, 1.1 parts by weight of organic silicon compound and 0.4 parts by weight of organic tin.

Embodiment 3

A light reflective coating for an audio product, comprising the following parts by weight of constituents: 15 parts by weight of amino epoxy resin, 35 parts by weight of glass beads, 35 parts by weight of aluminum beads, 5 parts by weight of organic amine solidifying agent, 5 parts by weight of n-butyl acetate, 3 parts by weight of dimethylbenzene, 1 part by weight of fumed silicon dioxide, 0.3 parts by weight of polyester dispersing agent, 0.2 parts by weight of organic silicon compound and 0.5 parts by weight of organic tin.

Embodiment 4

A light reflective coating for an audio product, comprising the following parts by weight of constituents: 20 parts by weight of acrylic resin, 25 parts by weight of glass beads, 20 parts by weight of aluminum beads, 8 parts by weight of polyurethane solidifying agent, 15 parts by weight of n-butyl acetate, 5 parts by weight of dimethylbenzene, 4 parts by weight of fumed silicon dioxide, 1 part by weight of polyester dispersing agent, 1.5 parts by weight of organic silicon compound and 0.5 parts by weight of organic tin.

Embodiment 5

A method for preparing the light reflective coating for an audio product, comprising the following steps: adding appropriate amount of solvent, resin, and additive, stirring until uniform, sequentially adding aluminum beads, glass beads and appropriate amount of solvent, stirring again until uniform, sequentially adding solidifying agent and the remaining solvent, and stirring until uniform to obtain the light reflective coating for an audio product, wherein the stirring time each time is 20-30 min.

Wherein the solvent is a mixture of n-butyl acetate and dimethylbenzene; the additive is a mixture of a suspending agent, a dispersing agent, a leveling agent and a catalyst; the suspending agent is fumed silicon dioxide; the dispersing agent is a polyester dispersing agent; the leveling agent is an organic silicon compound; and the catalyst is organic tin; the particle diameters Φ of the glass beads are 20-50 μm; the particle diameters Φ of the aluminum beads are 20-30 μm; the glass beads and the aluminum beads have the advantages of light weight, low heat conduction coefficient, high strength, good chemical stability and the like; the specially treated surface thereof has an oleophylic hydrophobic property; the coating is extremely easy to be dispersed in an organic material system, and has a good light reflective performance.

Wherein the resin is amino epoxy resin or acrylic resin; when the resin is amino epoxy resin, the solidifying agent selects organic amine solidifying agent; and when the resin is acrylic resin, the solidifying agent selects polyurethane solidifying agent.

The FIGURE is a schematic view showing the reflection of a light source coated with the light reflective coating. Amino epoxy resin or acrylic resin is adopted as a film forming material, thus greatly improving the light resistant, waterproof, wear resistant and anti-aging performances of the light reflective coating, and enabling the light reflective coating to having good adhesive force and quick solidification speed. The glass beads, the aluminum beads and the fumed silicon dioxide have extremely high specific surface areas, thus closely combining the cross-linked structure of the light reflective coating, and improving the corrosion-proof capability of the light reflective coating. The polyester dispersing agent has the effect of stabilizing a stereoscopic system, and an organic silicon compound is adopted as a wetting and leveling agent, thus reducing the surface tension of the coating, and improving the evenness and uniformity of the coating. Under the assistance and cooperation of the fumed silicon dioxide, the polyester dispersing agent, the organic silicon compound and the organic tin, the coating can be uniformly dispersed in the film forming resin, enabling the prepared light reflective coating to have a flat, fine and smooth surface, and good gloss retention.

When the light reflective coating is coated on a plastic product (equivalent to a material) in any irregular structures, first the material is cleaned with a pneumatic gun or other tools so as to remove sundries and dust. Then the entire material is uniformly coated with prime paint, wherein the prime paint can be a conventional color paint, and is mainly used for toning and improving adhesive force When the light reflective coating is coated, a large nozzle spray gun (Φ1.5-3.0 mm) is used. The spray gun is uninterruptedly stirred or shaken during coating operation, so as to ensure the light reflective coating to be uniform. During coating, high air pressure and oil volume are adopted to prevent the gun from being blocked and ensure the paint film to be wet. After the coating, the wet film is naturally leveled for 2-20 min, enabling the filler to be naturally and sequentially arranged, and then the wet film is fully dried and solidified by baking under the temperature 60-80° C. for 30 min. The thickness of the formed film is 30-50 μm, so as to ensure the performance of the light reflective coating.

The content above is only an example and i illustrates the structure of the present invention, but should not be considered as a limitation to the scope of the present invention patent because of the specific and detailed description thereof. It should be pointed out that an ordinarily person skilled in the art could make various variations and improvements without departing from the concept of the present invention. And the obvious substitutions are all concluded in the protection scope of the present invention.

The invention claimed is:

1. A light reflective coating for an audio product, comprising the following parts by weight of constituents: 15-35 parts by weight of resin, 15-35 parts by weight of glass beads, 20-40 parts by weight of aluminum beads, 5-15 parts by weight of a solidifying agent, 10-25 parts by weight of a solvent and 1-8 parts by weight of an additive.

2. The light reflective coating for an audio product according to claim 1, wherein the solvent is a mixture of n-butyl acetate and dimethylbenzene.

3. The light reflective coating for an audio product according to claim 2, wherein the parts by weight of the n-butyl acetate and the dimethylbenzene are respectively 15-20 parts by weight and 3-8 parts by weight.

4. The light reflective coating for an audio product according to claim 1, wherein the additive is a mixture of a suspending agent, a dispersing agent, a leveling agent and a catalyst.

5. The light reflective coating for an audio product according to claim 4, wherein the parts by weight of the suspending agent, the dispersing agent, the leveling agent and the catalyst are respectively 1-5 parts by weight, 0.2-2 parts by weight, 0.2-2 parts by weight and 0.1-0.5 parts by weight.

6. The light reflective coating for an audio product according to claim 1, wherein the resin is amino epoxy resin or acrylic resin.

7. The light reflective coating for an audio product according to claim 1, wherein the solidifying agent is an organic amine solidifying agent or a polyurethane solidifying agent.

8. The light reflective coating for an audio product according to claim 4, wherein the suspending agent is fumed silicon dioxide; the dispersing agent is a polyester dispersing agent; the leveling agent is an organic silicon compound; and the catalyst is organic tin.

9. A method for preparing the light reflective coating for an audio product according to claim 1, comprising the following steps:

adding a first portion of the solvent, the resin, and the additive, stirring until uniform, sequentially adding the aluminum beads, the glass beads and a second portion of the solvent, stirring again until uniform, sequentially adding the solidifying agent and the remaining solvent, and stirring until uniform to obtain the light reflective coating for an audio product.

* * * * *